March 27, 1928.
A. P. HALL
FILTERING DEVICE
Filed Feb. 6, 1926
1,664,252
2 Sheets-Sheet 1
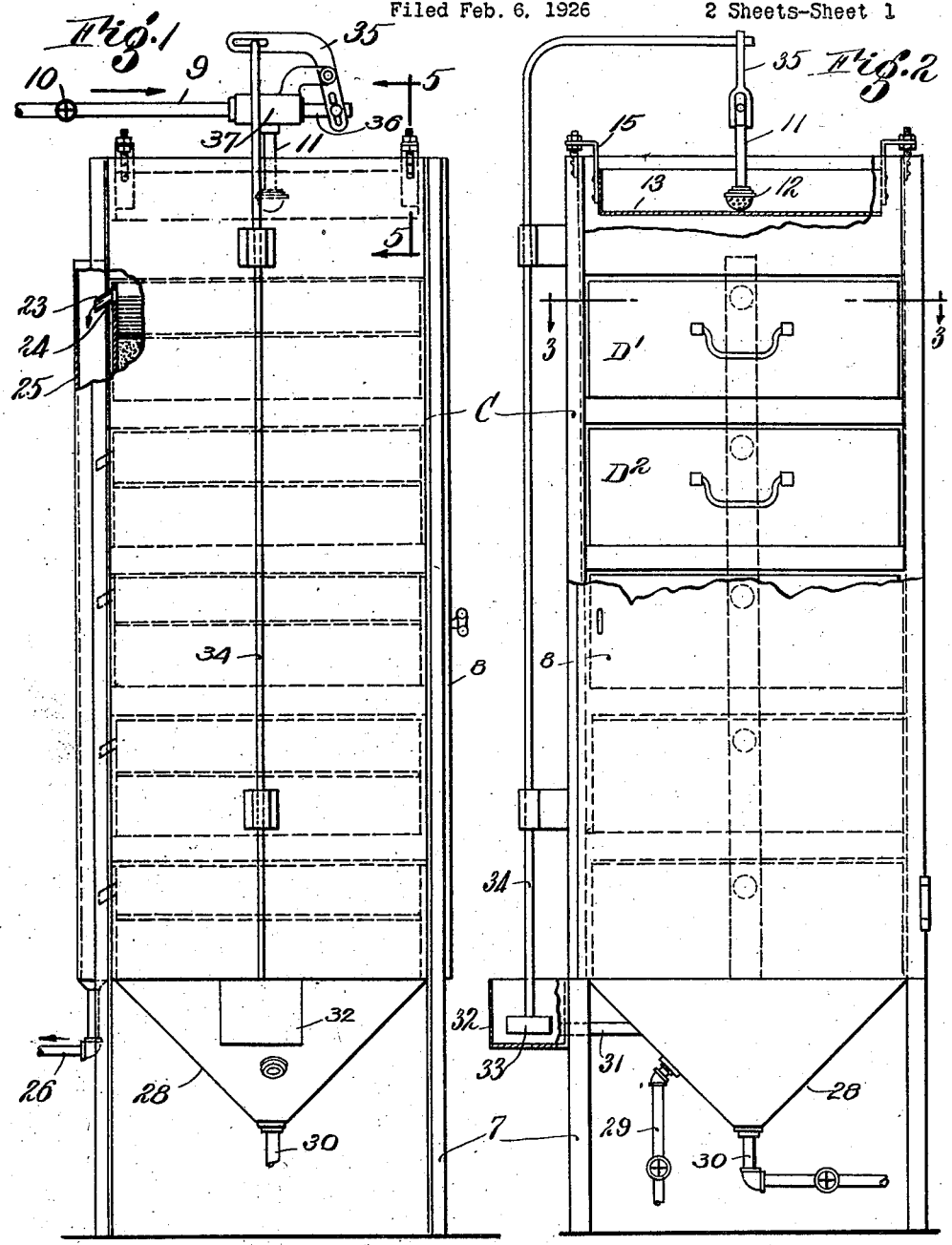

March 27, 1928.
A. P. HALL
1,664,252
FILTERING DEVICE
Filed Feb. 6, 1926
2 Sheets-Sheet 2
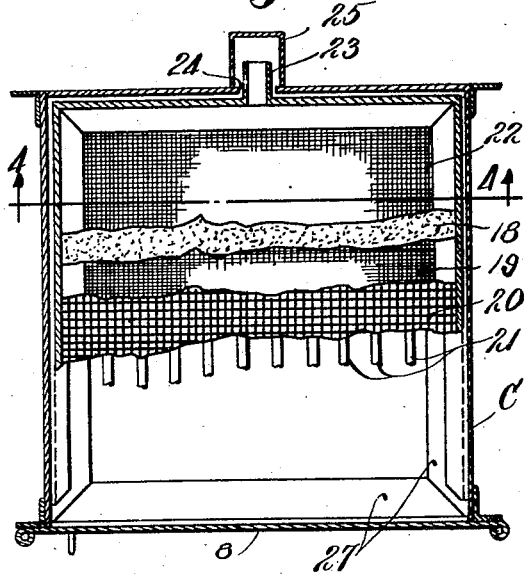
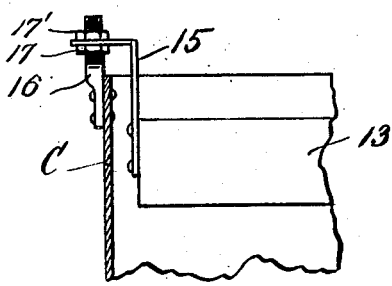
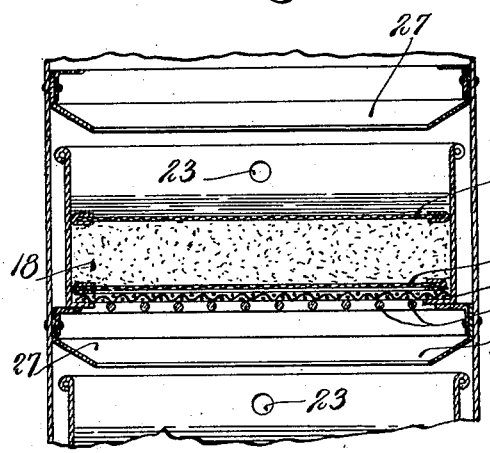
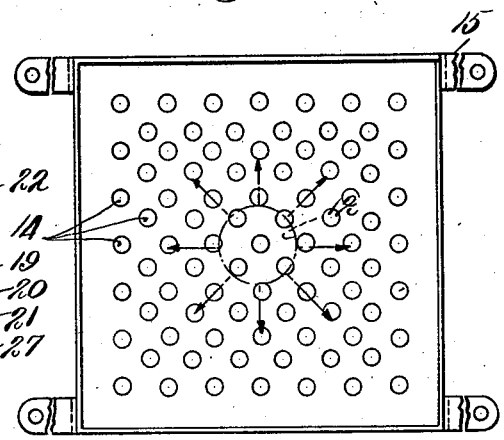

Patented Mar. 27, 1928.

1,664,252

UNITED STATES PATENT OFFICE.

ARTHUR P. HALL, OF WEST NEWTON, MASSACHUSETTS.

FILTERING DEVICE.

Application filed February 6, 1926. Serial No. 86,425.

This invention relates to a process and apparatus for filtering liquids to remove undesirable foreign matter mixed or suspended in the liquid, and the principal purpose of the invention is the provision of a simple and economical method and means for producing a clear filtrate from a previously unclean liquid.

The invention is particularly adapted to the purpose of obtaining this result in the purification of such liquids as naphtha or gasoline, which are customarily employed in clothes cleansing operations, and it will therefore be illustrated and described in respect to one preferred embodiment suitable for this purpose. Cleansing operations of this nature are widely used in establishments devoted to the so-called "naphtha cleansing" of various articles of wearing apparel, in which it is customary to have large reservoirs of naphtha, the contents of which are used successively in an infinite number of cleaning baths. It is obvious that the residuum of naphtha remaining in the bath after one cleansing operation contains an accumulation of foreign material, such as grease, dirt and lint, which has been removed from the clothing; and that this residuum must be cleaned of this foreign matter before it can be again used for cleansing.

The preferred manner of cleansing this naphtha is by filtration, but the methods and apparatus heretofore utilized have included many undesirable and objectionable features. The principal objection has been that a clean filtrate could not be obtained without the utilization of cumbersome and expensive apparatus, if at all; with the additional difficulty that such apparatus required more or less constant attention by skilled operators, and the frequent replacement of new filter beds. It is, therefore one object of the present invention to devise a method of obtaining uniform purity and cleanliness in the filtered naphtha by comparatively rapid and simple operations, with the consequent saving in time and expense, in which the chief features reside in the uniform distribution of the unclean naphtha upon a filter bed and the subsequent successive filtration of the original filtrate in the same manner through a series of filter beds, preferably constructed as hereinafter described.

Further objects include the provision of filtering apparatus having a series of superposed interchangeable filter bed sections, the top section of the series being leveled by suitable means and each section having means adapted to obviate the tendency of overflowing, but also being provided with drains to carry overflowing liquid through a common conduit back to the reservoirs. The particular advantages of these and other features of the invention will be explained in the accompanying description and pointed out in the appended claims.

A preferred embodiment of the invention is illustrated in the accompanying drawings, in which—

Fig. 1 is a side elevation of the improved filtering apparatus, with portions thereof in section;

Fig. 2 is a front elevation thereof, with portions broken away;

Fig. 3 is an enlarged section on the line 3—3 of Fig. 2 showing also certain details of construction of the filter bed;

Fig. 4 is an enlarged broken section on the line 4—4 of Fig. 3;

Fig. 5 is a detail of one means of leveling a portion of the apparatus, taken on line 5—5 of Fig. 1; and Fig. 6 is a plan view of a liquid distributing pan forming part of the apparatus.

The apparatus comprises essentially a series of removable and interchangeable beds of filtering material, means for supplying naphtha to the top of the cabinet and for drawing off filtered naphtha from the bottom thereof, and means for insuring a substantially even distribution of the liquid through the topmost filter bed.

In the preferred form of device drawers or trays $D^1$ $D^2$ etc. open at the bottom are arranged one above another upon appropriate shelves in an upright cabinet C which stands upon legs 7 and may be provided with a hinged door 8 upon its front side. An inlet pipe 9 for unclean naphtha, having a cock 10, is suspended on suitable brackets above the cabinet and leads to a downwardly inclined pipe 11 projecting within the open top of the cabinet at its approximate center. A spray nozzle 12 is fixed to the end of pipe 11 so that the naphtha will be distributed in the first instance upon a distributing pan 13 suspended just below the nozzle 12. The bottom of pan 13 has a plurality of spaced apart perforations 14 (Fig. 6) to permit the liquid which may accumulate therein to drain with substantial uniformity of flow therefrom. This pan may be suspended within said open end of the cabinet by means of straps 15, preferably four in number, having outwardly bent top portions provided with holes fitting over threaded vertical posts 16 fastened to the cabinet. Adjusting nuts 17 and 17' threaded upon posts 16 on either side of said bent portion provide means for fixing the position of the pan 13. Since it is preferred that the bottom of pan 13 be level, the nuts should be adjusted to insure this desideratum. The ease by which this may be accomplished is apparent.

Each of the drawers D contains a bed of filtering material 18, such as lime, charcoal or saw dust, supported upon a relatively fine mesh wire screen 19. Screen 19 is in turn supported by a stronger screen 20 of larger mesh, and the latter rests upon stout rods 21 fixed transversely of the open bottom of the drawer. It has been found that when the drawers becomes substantially filled with naphtha, the filter material tends to expand and rise in the liquid. To keep the material compact, insuring even filtration and preventing "channeling" of the liquid through the central portion of the filter bed, and to prevent overflowing of the drawers, a relatively fine mesh screen 22 is preferably provided to rest upon the top surface of the filter material.

The "channeling" effect prevailing in prior devices of this nature is characterized by a definite tendency of the naphtha to form channels through the center of the filtering material, causing this portion of the filter bed to become soiled rapidly and producing an unclean filtrate, with the result that in a short time the liquid passing through the filtering material would be cloudy, necessitating frequent changes of the filter beds. The entire filtering compound in the bed, weighing in the neighborhood of from 150 to 200 pounds would then have to be dumped and replaced, with the consequent loss of a large portion of filtering material which remained unsoiled. Even distribution of the naphtha through the filter beds, resulting in part from the employment of the screens above described removes this objection and lessens the waste of material, the top screen 22, aiding in distributing incoming liquid over the top of the filter bed.

In case the inflow of liquid is so rapid that the drawers tend to fill to overflowing, a drain spout 23 may be provided through the rear wall of each drawer adjacent the top thereof. The spouts 23 project through openings 24 in the back of the cabinet, and lead into a common drain pipe 25 which extends downwardly to the bottom of the cabinet and is there connected to a return pipe 26 adapted to convey the excess naphtha back to the supply reservoir (not shown) of uncleaned naphtha.

Beneath the distributing pan and between each drawer are downwardly inclined shelves 27 fixed to each of the four walls of the cabinet. The width of the shelves 27 is such as to ensure that the liquid draining through the perforate pan 13 and the several filter beds will fall into the next succeeding filter bed, thus preventing seepage around the outer walls of the drawers.

The naphtha passing through the bottommost filter bed falls into a conical settling basin 28 and there accumulates until its level reaches a discharge pipe 29, leading from the basin at a point substantially above its bottom, through which the clean naphtha may be delivered to a suitable reservoir. A draw off pipe 30 for accumulated naphtha containing a portion of sediment which may have passed through the filter beds, is provided at the bottom of the basin 28 and may lead to the original supply reservoir, a suitable stop cock being located in the pipe 30 to permit the sediment to be drained as desired. In the event that the discharge pipe 29 will not draw all the naphtha accumulating in the basin, an overflow pipe 31 may lead from a point adjacent the top of the basin into a tank 32 fixed to the outer surface of a side wall of the cabinet C. A float 33, carried at the end of an elongate lever 34, is normally positioned within tank 32, adjacent its bottom. Lever 34 is connected at its upper end to a pivoted rocking arm 35, to the opposite end of which is connected a valve stem 36 leading into supply pipe 9 above pipe 11, in the manner shown in Fig. 1. The adjustment and arrangement of these members is such that upward movement of lever 34, due to the accumulation of excess naphtha in tank 32, rocks bar 35 to force the valve stem 36 into valve chamber 37 of the supply pipe, thus automatically shutting off the supply of naphtha until the liquid in tank 32 shall have drained back into basin 28, at which time the parts will automatically be restored to normal position because of the weight of the lever 34 and float 33.

If desired, however, the pipe 31 may be by passed to connect with return pipe 26, in order that excess liquid in tank 28 may be returned to the original reservoir.

The operation of the apparatus above described is practically automatic, and requires but little attention. Unclean naphtha or gasoline, remaining from previous clothes cleaning processes, is stored in a suitable reservoir which is not shown in the drawings but which may be of ordinary construction. Such reservoir is, however, preferably provided at its bottom with a settling basin similar to the basin 28, having a sediment draw-off pipe and a supply pipe for the apparatus herein described, namely the pipe 9. Naphtha supplied through this pipe is sprayed into the level pan 13 from the nozzle 12. Progress of the liquid through the perforations in the bottom of the pan is practically uninterrupted, the liquid dropping with uniform distribution upon the filter bed in the topmost drawer D¹ through which it sweeps by capillary attraction, finally filtering through in a partially cleansed condition into the filter bed D². This operation is automatically repeated through the succeeding filter beds until practically pure and thoroughly clean naphtha accumulates in settling basin 28. It is obvious that the finter beds in successive drawers will progressively absorb a lesser and lesser portion of the dirt and other foreign matter in the naphtha; the topmost drawer becoming soiled first and so on. For this reason the drawers are made interchangeable and an extra supply of drawers with clean filter beds are provided, so that when the topmost bed becomes saturated with foreign matter, it may be removed, after shutting off the supply at cock 10, and the lower drawers may be moved up one space each, a drawer of fresh filtering material being inserted at the bottom.

It has been found, however, that because of the even distribution of the incoming naphtha and the construction of the filter beds, particularly with respect to the upper and lower screens 22 and 19, filtration is uniformly effected through all parts of the filtering material and that for this reason the beds are less likely to be soiled quickly. In fact the apparatus may be left in operation over night without the necessity that an attendant be present. The provision of the additional means above described to take care of overflow in the drawers or settling basin, also ensures that harmful or undesirable results will not ensue from these causes, if the apparatus is left unattended. Greatest economy of operation and ease of manipulation is thereby achieved.

Although one preferred embodiment of this invention has been explained in detail in this description, it will be readily understood that variations in non-essential structural details may be utilized in similar devices without departing from the essence of the invention as defined in the following claims.

I claim:

1. In apparatus for cleansing liquids by filtration, a series of filter beds spaced one above another, a supply pipe for liquid to be cleansed leading over the topmost filter bed, and means for uniformly distributing the liquid supplied by said pipe uniformly over said topmost bed, whereby the liquid will drain through said bed and through the successive series of filter beds therebeneath, said filter beds being interchangeable so that when the topmost bed has become soiled by the accumulation of sediment from the liquid it may be removed and replaced by the filter bed next therebeneath, the remaining filter beds being advanced upward correspondingly and a fresh bed occupying the bottommost position.

2. In apparatus for cleansing liquids by filtration, an upright cabinet open at the top, a supply pipe for liquid to be cleansed leading over said cabinet and having an outlet adjacent the top thereof, a series of removable and interchangeable, relatively deep trays spaced one above another in the cabinet, each of said trays having an open portion at the bottom thereof and containing a bed of filtering material supported adjacent the bottom thereof, and an overflow pipe passing through one wall of each tray adjacent the top edge thereof, said pipes leading into a common conduit and said conduit leading to a reservoir furnishing liquid to said supply pipe.

3. In apparatus for cleansing liquids by filtration, an upright cabinet open at the top, a supply pipe for liquids to be cleansed leading over the cabinet and having an outlet centrally positioned with respect to the open top of the cabinet, a series of removable and interchangeable trays spaced one above another within the cabinet, a perforate distributing pan between the said outlet and the topmost tray, means for leveling the pan whereby the liquid supplied from said outlet to the pan will drain through the pan and be distributed uniformly into said tray, each of said trays being open at the bottom and containing a bed of filtering material, and means for maintaining said filtering material in a compact mass when wet, whereby the liquid distributed from said pan will filter with substantial uniformity through all portions of the topmost bed and thence through the succeeding beds therebeneath.

In testimony whereof I affix my signature.

ARTHUR P. HALL.